May 13, 1924.
O. R. DAILEY
1,493,609
COMBINED REAR VIEW MIRROR AND GLARE SHIELD
Filed June 28, 1922
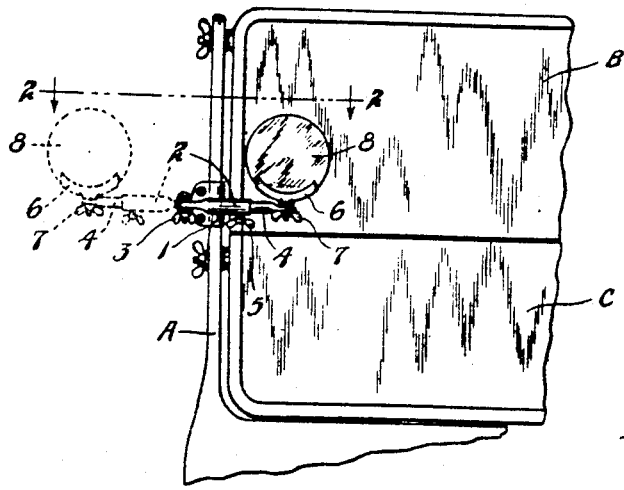
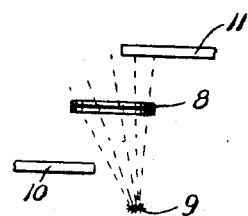
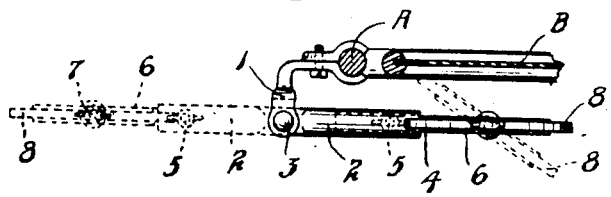
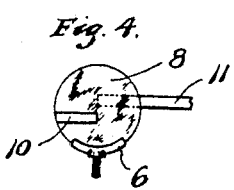
INVENTOR.
OWEN R. DAILEY
BY HIS ATTORNEY.

Patented May 13, 1924.

1,493,609

UNITED STATES PATENT OFFICE.

OWEN R. DAILEY, OF ST. PAUL, MINNESOTA, ASSIGNOR, BY MESNE ASSIGNMENTS, TO STATE BANK OF NICHOLS, OF NICHOLS, WISCONSIN, A CORPORATION OF WISCONSIN.

COMBINED REAR-VIEW MIRROR AND GLARE SHIELD.

Application filed June 28, 1922. Serial No. 571,513.

*To all whom it may concern:*

Be it known that I, OWEN R. DAILEY, a citizen of the United States, residing at St. Paul, in the county of Ramsey and State of Minnesota, have invented certain new and useful Improvements in Combined Rear-View Mirrors and Glare Shields; and I do hereby declare the following to be a full, clear, and exact description of the invention, such as will enable others skilled in the art to which it appertains to make and use the same.

This invention relates to a rear view vehicle mirror and a glare shield device. Automobiles are now commonly provided with a mirror so disposed that the driver can obtain a view of the road in the rear of the machine and it is also now a quite common practice to have a glare shield mounted on the front of the wind shield.

It is an object of this invention to provide a device of special construction which will constitute both a rear view mirror and a glare shield.

It is a further object of the invention to provide such a device made from an especially constructed mirror having peculiar properties adapting the same to have all the necessary functions.

These and other objects and advantages of the invention will be fully set forth in the following description made in connection with the accompanying drawings in which like reference characters refer to the same parts throughout the different views, and in which—

Fig. 1 is a view in elevation of a portion of an automobile and a wind shield attached thereto showing the device of the invention thereon and the same in a different position in dotted lines;

Fig. 2 is a horizontal section taken on the line 2—2 of Fig. 1, as indicated by the arrows, also showing the parts in different positions in dotted lines; and Figs. 3 and 4 are, respectively, a plan and a view in elevation illustrating the action of the device.

Referring to the drawings, the front portion of an automobile having the wind shield supporting standard A is shown to which are attached the sections B and C of a common type of wind shield.

In accordance with this invention, a clamp member 1 is attached to the standard A so as to be movable to various points thereon, and an arm 2 is pivotally attached to said clamp by having its flattened end extending between spaced lugs on the clamp and connected thereto by a threaded bolt, said parts being adapted to be clamped in various adjusted positions by a thumb nut 3 threaded on said bolt. The arm 2 is made hollow and a second arm 4 is received therein and held in various adjusted positions longitudinally thereof by a thumb nut 5. The outer end of arm 4 is flattened and has a vertical aperture extending therethrough receiving a threaded stud formed on the end of a bracket 6, said bracket and nut being movable to various positions about the axis of said stud and clamped in desired position by a thumb nut 7. The bracket 6 is of conical or segmental shape and has securely fitted therein a circular shaped mirror-like device 8. This member 8 made of a semi-transparent mirror is what is commonly known as an X-ray mirror and comprises a comparatively heavy plate of glass having disposed on one side thereof, a thin metallic coat. Another thinner piece of ordinary transparent glass is fitted over this coat and secured against the first mentioned glass. This type of mirror is frequently used in the rear of drug stores or other commercial establishments. With a dark back ground, the device acts as a perfect mirror and anyone entering the store will thus see only the reflections in the mirror. The druggist or other person in the store who is behind the glass seeing the light background of the door can, however, see therethrough and see any person or objects in front of the same. The ordinary function of the X-ray mirror therefore is simply to form a screen, acting as a mirror on one side and forming a transparent medium permitting vision therethrough by a person on the other side. Applicant has discovered that such a device has properties rendering the same of great utility in connection with a vehicle. The coating on the thicker glass plate gives the effect of a slight color on the glass so that the mirror dims appreciably any light passing therethrough. When such a device is placed in front of the wind shield therefore the bright rays of the sun or the bright glare from the lamps of an approaching machine are suitably dimmed so that there is no glare in the eyes of the driver. The foreground adjacent the machine being bright the device does not obstruct the vision and the driver can readily see through the device and see objects on the road in front of him.

The action of the device 8 is illustrated in Figs. 3 and 4. In Fig. 3, the eye of the driver is designated as 9 and an object at the rear of the machine as 10, and an object in front of the machine is designated as 11.

In Fig. 4, which represents the side of the device toward the driver, it is seen that the object 10 is reflected in the device while the object 11 can be seen through the device. The object 11 will appear slightly fainter than if the device were not interposed in the vision. This is due to the slight dimming effect of the device which function renders it of great utility as a glare shield.

In operation, the driver will adjust the device by means of thumb screws described so that the plate 8 is in proper position to intercept the direct light of the sun or the bright light from approaching vehicles depending on whether the device is used in daytime or at night. The plate 8 can, at the same time, be adjusted at the correct angle to form the rear view mirror. The plate 8 therefore, in addition to its usual functions, namely, those of forming a mirror on one side and a transparent screen on the other, acts as a glare shield and as a rear view mirror.

The device is shown in Fig. 1 as disposed at the front of the wind shield. During portions of the day when a glare shield is not needed, the device may be swung to the dotted line position shown in Fig. 1 when used merely as an extended rear view mirror. If desired, the device can be placed on the outside of the wind shield by inverting the bracket 1 and inserting the stud of bracket 6 from the other side of arm 4 than the side shown.

The device can also be used as a spot light by inclining the plate 8 at such an angle that the light from lamps of approaching machines will be reflected to one side of the road by the mirror effect of the outer or front surface of the plate 8. In fact, when the device is used as a rear view mirror and glare shield, a considerable portion of the light from approaching machines will be reflected back in a forward direction.

From the above description it is seen that applicant has invented a combined glare shield and mirror device having great utility. The device can be easily and inexpensively made, quickly and easily attached to practically all modern types of automobiles and other vehicles.

It will, of course, be understood that various changes may be made in the form, details, and proportions of the parts without departing from the scope of applicant's invention, which, generally stated consists in the matter shown and described and set forth in the appended claims.

What is claimed is:

1. A combined rear view mirror and glare shield device for a vehicle comprising, a plate formed of a semi-transparent mirror adapted to reflect objects in the rear of the vehicle into the driver's vision and which is transparent so that images in front of the vehicle may be seen therethrough but which intercepts sufficient light to form a glare shield, and means for supporting said plate adjacent the front of a vehicle.

2. A combined rear view mirror and glare shield device for a vehicle comprising, a plate formed of an X-ray or semi-transparent mirror adapted to reflect objects in the rear of said vehicle into the driver's vision and which is transparent so that images in front of said vehicle may be seen therethrough, said device also being of such transparency as to afford an efficient glare shield, supporting means for said device movable about axes at right angles adapted to attach the same to a vehicle whereby the said plate can be used as a glare shield or as a rear view mirror.

3. The combination with an automobile and the wind shield standard thereof, of means clamped to said standard, an arm pivoted to said means to swing about a vertical axis, a second arm extensibly secured to said first mentioned arm, and a plate device mounted at the end of said second mentioned arm to swing about a vertical axis, said plate device comprising glass plates adapted to reflect images at the rear thereof into the driver's vision, being transparent so that objects in front of the vehicle may be seen therethrough and being of such a degree of transparency as to form a glare shield.

4. The combination with an automobile and wind shield thereof, of a rear view mirror and glare shield having sufficient reflecting surface at one side to reflect objects in the rear of said automobile into the driver's vision and being sufficiently translucent to intercept a portion of the light from the sun or approaching machines to form a glare shield and formed as a mirror on its other side to reflect some of said light back toward the front of the vehicle and means for supporting said device either in line with the wind shield or at one side thereof.

In testimony whereof I affix my signature.

OWEN R. DAILEY.